(12) United States Patent
Miyaji et al.

(10) Patent No.: US 8,178,195 B2
(45) Date of Patent: May 15, 2012

(54) BIAXIALLY ORIENTED FILM LAMINATED BOARD, ELECTRICAL INSULATION BOARD AND MACHINE PART

(75) Inventors: Shinichiro Miyaji, Kouka (JP); Makoto Koyama, Nagoya (JP); Miyoshi Yokura, Otsu (JP)

(73) Assignees: Toray Industries, Inc., Tokyo (JP); Kawamura Sangyo Co., Ltd., Yokkaichi-Shi (JP)

( * ) Notice: Subject to any disclaimer, the term of this patent is extended or adjusted under 35 U.S.C. 154(b) by 1023 days.

(21) Appl. No.: 12/085,552

(22) PCT Filed: Nov. 21, 2006

(86) PCT No.: PCT/JP2006/323167
§ 371 (c)(1),
(2), (4) Date: May 27, 2008

(87) PCT Pub. No.: WO2007/060929
PCT Pub. Date: May 31, 2007

(65) Prior Publication Data
US 2009/0258207 A1 Oct. 15, 2009

(30) Foreign Application Priority Data
Nov. 28, 2005 (JP) ................. 2005-341869

(51) Int. Cl.
*B32B 7/02* (2006.01)

(52) U.S. Cl. .................. 428/220; 428/337

(58) Field of Classification Search .......... 428/220, 428/337
See application file for complete search history.

(56) References Cited

U.S. PATENT DOCUMENTS

| 4,298,719 A * | 11/1981 | Mizuno et al. ........ 526/255 |
| 5,858,507 A * | 1/1999 | Yoshida et al. ........ 428/141 |
| 7,001,557 B2 | 2/2006 | Tsunekawa et al. |

FOREIGN PATENT DOCUMENTS

| JP | 6-079846 A | 3/1994 |
| JP | 2000-309650 A | 11/2000 |
| JP | 2002-067148 A | 3/2002 |
| JP | 2004-130761 A | 4/2004 |

* cited by examiner

*Primary Examiner* — David Sample
*Assistant Examiner* — Lawrence Ferguson
(74) *Attorney, Agent, or Firm* — Birch, Stewart, Kolasch & Birch, LLP

(57) ABSTRACT

Disclosed is a biaxially oriented film laminated board having a thickness of 0.5 mm or more, wherein biaxially oriented films composed of a resin composition having a melting point of 240° C. or higher are laminated at a multi-layer condition without interposing an adhesive therebetween. This biaxially oriented film laminated board is characterized in that the minimum value among the elongation at break in the longitudinal direction and that in the transverse direction is 25% or more when the board is punched into a rectangular form. Also disclosed are various electrical insulation boards and machine parts each using the laminated board. A laminated board having properties of a biaxially oriented film including thermal resistance, electrical insulation, mechanical strength, flexibility and workability can be obtained.

6 Claims, No Drawings

BIAXIALLY ORIENTED FILM LAMINATED BOARD, ELECTRICAL INSULATION BOARD AND MACHINE PART

TECHNICAL FIELD OF THE INVENTION

The present invention relates to a biaxially oriented film laminated board and products comprising the same, and more specifically, to a laminated board having properties of a biaxially oriented film excellent in mechanical strength, electrical insulation property and thermal resistance, and provided with flexibility, and excellent also in workability, and products comprising the same.

BACKGROUND ART OF THE INVENTION

Recently, accompanying with rapid technical development of electronic equipment and devices, it is required to make the performances of electronic and electrical insulation materials higher. Even in the field of a large electric machine such as a rotational machine (a motor, a dynamo, etc.) or a transformer, requirements of miniaturization and lightening, high efficiency and high reliability are increasing day by day. As an electric insulation material used in this field, usually, a thick large electric insulation material, which is formed as a board-like shape and/or processed by drawing or punching, is used, and for such an electrical insulation material, workability and reduction of impact to the environment are required in addition to making it lighter and thinner, and providing properties such as mechanical strength, electrical insulation and thermal resistance. And these properties have to be provided at a good balance. Further, recently, a usage, in which stress is concentrated to an insulation material due to miniaturization and functionalization, has appeared, and therefore, flexibility and toughness are also important properties which are to be required to an insulation material. Of course, it is needless to say that the insulation material should not have defects such as voids and cracks therein.

As the conventional electrical insulation materials and plastic boards used in this field, the following ones are known.
(1) Pressboards of insulation papers produced from craft pulp etc. and molded products thereof are known (for example, Non-patent document 1, Patent document 1).
(2) As an insulation material having thermal resistance, insulation materials and boards, which mainly comprise an aromatic polyamide paper, are known (for example, Non-patent document 1, Patent document 2).
(3) In consideration of thermal resistance and mechanical strength, composites or boards made from epoxy resin and glass fibers are used in an insulating system of electric power equipment or as a base material for a circuit substrate (for example, Non-patent document 1, Patent document 3).
(4) As plastic boards proposed for the purpose of high strength and lightening, composite boards containing carbon fibers, which can be formed in various shapes by being molded at a condition of a prepreg, are known (for example, Patent document 4).
(5) Plastic molded products, which are formed in various shapes by adding a large amount of inorganic additives to a nylon-group or polyester-group resin and melt-molding it by injection molding and the like, are known.

On the other hand, as biaxially oriented laminated films, the following ones are known.
(6) For the purpose of greatly improving the tear strength of a film, a multi-layer laminate (5 to 3000 layers) of biaxially oriented polyethylene terephthalate films (hereinafter, also referred to as "PET-BO" for short), which are laminated at the time of melt extrusion, is proposed (for example, Patent document 5).
(7) As a thermal resistant electrical insulating laminated film, it is proposed that a laminated film, formed by bonding a biaxially stretched polyphenylene sulfide film (hereinafter, also referred to as "PPS-BO" for short) and a non-stretched polyphenylene sulfide sheet (hereinafter, also referred to as "PPS—NO" for short) by thermal fusion, is used in the field requiring thick insulation materials such as a field for motors (for example, Patent document 6).
(8) Further, it is generally known that the limit of thickness of a single-layer biaxially oriented (stretched) film is 480 μm (for example, Non-patent document 2).

Patent document 1: JP-A-2001-202839
Patent document 2: JP-A-7-246629
Patent document 3: JP-A-2003-127274
Patent document 4: JP-A-2003-201388
Patent document 5: JP-A-2004-130761
Patent document 6: JP-A-2-45144
Non-patent document 1: Technical Report of Japan Electric Society, 907 Department (A department), published on Dec. 20, 2002
Non-patent document 2: Plastic Film•Resin Material Handbook (2004), Processing Technology Institute

DISCLOSURE OF THE INVENTION

Problems to be solved by the Invention

However, the conventional insulation boards and laminated films had problems described below and have been limited in development in this field.

In the pressboards comprising a pulp material as its base material and molded products thereof of the above-described item (1), it is necessary to make the thickness of an insulation material greater because of their low insulating property and low mechanical strength, and they are not suitable for achieving small size and high output. Further, because the water absorption of the base material is high, the above-described boards and molded products thereof have been restricted to be applied to the fields requiring moldability and dimensional accuracy, and have had problems of operation ability and dust because paper powder and the like was generated in the process of punching or cutting. Moreover, because the base material is low in elongation at break and poor in flexibility, they have not been able to be used for insulation of a stress concentrated portion. The insulation materials and boards mainly comprising an aromatic polyamide paper in the above-described item (2) are excellent in thermal resistance and therefore they have been frequently used in high-temperature electric insulating fields, but because their base materials are fibrous sheets, basically they have had problems similar to those of the boards in the above-described item (1). The composite materials and board comprising epoxy resin and glass fibers in the above-described item (3) and the products made therefrom have a high thermal resistance, and have a high mechanical strength because of the reinforcement by glass fibers, but, in order to obtain a certain level of strength, their thicknesses become greater and their weights become greater because the amount of used glass fibers increases. In the case of molding, it is necessary to mold them at a prepreg condition and thereafter to harden the epoxy resin, therefore it takes a long time for molding and it has been disadvantageous in cost. Although composite materials (boards) containing carbon fibers in the above-described item (4) are excellent in thermal resistance and lightness, they become thick in a case requiring a certain level of strength similar to the case of the above-described item (3), and the molding must be performed at a prepreg condition, and therefore, the time loss for the processing becomes long and it is disadvantageous in cost. In the plastic molded products and boards of the above-described item (5), because generally a large amount of inorganic filler is mixed therewith to provide thermal resistance and mechanical strength, they are low in elongation at break and they are fragile. Therefore, the methods for processing and the parts to be applied have been restricted. In the multi-layer laminated films comprising biaxially oriented films of a polyethylene terephthalate (hereinafter, also referred to as "PET" for short) group in the above-described item (6), although they are excellent in thermal resistance, mechanical strength, flexibility, chemical resistance, etc., and are suitable for electrical insulation materials, because in the manufacturing process they are laminated at a molten condition and are oriented biaxially by stretching, their thicknesses are limited to be less than 500 μm on process, and therefore, materials called as "board" cannot be obtained (for example, the above-described Non-patent document 2). Further, although a method for laminating the PET-BO via an adhesive may be considered, it is very likely that the property of the adhesive gives a bad influence to the laminated board (for example, reduction of thermal resistance, chemical resistance, oil resistance, etc.). Especially, when laminated at a multi-layer style, the amount of the adhesive increases and the above-described influence tends to be greater. In the laminated films of PPS-BO and PPS-NO in the above-described item (7), because they are produced by a high-temperature fusion lamination (thermally pressing process), a thick material having a thickness of about several millimeters can be processed. In this structure, although there is no problem in a case less than 500 μm in thickness, if the thickness becomes greater, the non-stretched sheet having a low softening point used for ensuring the close contact property of lamination interface is crystallized by being heated in the processing or in the applied atmosphere and it becomes fragile, and cracks may be generated by stress concentration and the like, and therefore, there has been a problem that the reliability for insulation may decrease.

Accordingly, paying attention to the above-described problems, an object of the present invention is to provide a biaxially oriented film laminated board which uses a biaxially oriented (stretched) film having properties of insulation property and flexibility (high elongation at break), and which is excellent in thermal resistance, insulation property, mechanical strength, flexibility and workability and can extend the freedom for designing insulation materials, and products thereof. Namely, an object of the present invention is to provide a biaxially oriented board-like material, which can keep the properties of the biaxially oriented film and which has not been achieved by the film in the conventional technologies.

A biaxially oriented film laminated board aimed in the present invention can be applied not only to an insulation board but also to fields requiring miniaturization and lightening such as machine parts like gears and rollers, vehicle related members (for example, various reinforcing members for doors, bonnets, floor materials, etc., molded products, members for respective mechanisms, insulation members, etc.), and other members.

Means for Solving the Problems

In the present invention, it has been found that a board optimum for electrical insulation field requiring miniaturization, lightening and functionalization, and having all properties of thermal resistance, insulation property, mechanical strength and flexibility which are the characteristics of a biaxially oriented film, can be obtained by laminating biaxially oriented films at a multi-layer style at a specified condition without interposing an adhesive layer. Namely, the present invention employs the following means in order to achieve such a subject matter.

(1) A biaxially oriented film laminated board characterized in that the board has a thickness of 0.5 mm or more and is formed by laminating biaxially oriented films composed of resin composition having a melting point of 240° C. or higher at a multi-layer condition without interposing an adhesive therebetween, and the minimum value among an elongation at break in the longitudinal direction and that in the transverse direction measured after punching the board into a rectangular shape is 25% or more.

(2) The biaxially oriented film laminated board described in the above (1), wherein the above-described biaxially oriented films are biaxially oriented polyester films, and a refractive index of biaxially oriented film layers after lamination is maintained to be 1.590 or more.

(3) The biaxially oriented film laminated board described in the above (1), wherein the above-described biaxially oriented films are biaxially oriented polyphenylene sulfide films, and both of orientation degrees OF in End direction and Edge direction of biaxially oriented film layers after lamination, which are determined by X-ray diffraction, is maintained to be 0.85 or less.

(4) An electrical insulation board, wherein 50% or more of the electrical insulation board relative to the total thickness of the electrical insulation board is formed by a biaxially oriented film laminated board according to any of the above-described (1) to (3).

(5) A machine part, wherein the machine part is manufactured by using a biaxially oriented film laminated board according to any of the above-described (1) to (3) as its substrate and processing the substrate.

Effect According to the Invention

The biaxially oriented film laminated board according to the present invention thus structured becomes a board which has all properties of thermal resistance, electrical insulation property, mechanical strength, flexibility and workability that are the properties of a biaxially oriented film. The board is optimum as a board or a processed material in the electrical insulation field requiring miniaturization, lightening and functionalization, and can be applied also to various machine parts such as parts for vehicles and machinery by utilizing the properties of lightness, high strength, flexibility, thermal resistance and chemical resistance.

THE BEST MODE FOR CARRYING OUT THE INVENTION

Hereinafter, the present invention will be explained in more detail together with desirable embodiments of the present invention.

A biaxially oriented film laminated board according to the present invention (hereinafter, also referred to as "film laminated board" for short) comprises biaxially oriented layers of a resin composition having a melting point of 240° C. or higher. The melting point mentioned here means a temperature at which a solid of the resin composition is molten and transformed into liquid, and is a temperature of a melting peak determined by the differential scanning calorimetry (DSC) described later. In the present invention, if the melting point is lower than 240° C., the board is low in long-term thermal resistance and it cannot be used as an insulation material for electric power equipment. Further, the higher the melting point of the resin composition in the present invention is, the more advantageous it becomes in thermal resistance, but if the melting point is too high, it becomes difficult to process a film, and therefore, the melting point is particularly preferred to be 400° C. or lower. Further, although the resin composition employed in the present invention is not particularly restricted as long as it is a crystalline polymer having the above-described melting point of 240° C. or higher, as preferable examples, a polyester resin such as a polyethylene terephthalate (hereinafter, also referred to as "PET" for short), a polyethylene naphthalate (hereinafter, also referred to as "PEN" for short), etc., a polyphenylene sulfide (hereinafter, also referred to as "PPS" for short), a polyetheretherketone (hereinafter, also referred to as "PEEK" for short), an aromatic polyamide (hereinafter, also referred to as "aramide" for short), a polyimide, etc. can be exemplified. Among these, resins of PET, PEN and PPS are particularly preferred from the viewpoints of thermal resistance, chemical resistance, mechanical properties and workability. Further, the resin composition means that the above-described resins may be mixed with an inorganic or organic filler or additive such as a lubricant, a colorant or a crystalline nuclei agent, or with other polymers, and from the viewpoint of keeping the mechanical strength, flexibility (elongation at break), thermal resistance, etc. that are the purposes in the present invention, the substances to be mixed are preferred to be in a range of 40% by weight or less. Further, each polymer may contain bonds capable of being copolymerized.

In the present invention, the biaxially oriented film means a film or a sheet prepared by stretching a non-stretched amorphous sheet, which is obtained from the above-described resin composition by a known process such as melt extrusion or solution extrusion, in the longitudinal and transverse directions, and orienting the molecules of the resin sheet biaxially after heat treatment. Although the thickness of the film or sheet used is not particularly restricted, the thickness is preferably in a range of 10 to 450 μm because of easiness of processing for multi-layer lamination. The degree of orientation of the biaxially oriented film layer composed of a polyester such as PET or PEN, or PPS, which is particularly preferred in the present invention, is determined by the following method.

A biaxially oriented polyester film and refractive index thereof will be explained. A polyester polymer means a polymer whose main constituent comprises aromatic dicarboxylic acid, alicyclic dicarboxylic acid or aliphatic dicarboxylic acid, and diol. Although the polyester polymer is not particularly restricted, it is preferred that the polyester polymer comprises both terephthalic acid as a dicarboxylic acid component and ethylene glycol as a diol component and has an intrinsic viscosity [η] of 0.50 or more (more preferably in a range of 0.5 to 1.2), because it can have good film forming property, thermal resistance, mechanical properties, etc. Where, an intrinsic viscosity [η] is a value determined by dissolving a polyester film using o-chlorophenol as a solvent and measuring it at a temperature of 25° C., and the viscosity is in a proportional relationship with polymerization degree of the polyester polymer. The biaxially oriented layer of polyester group resin used in the present invention is preferred particularly to be PET or PEN. A polyester group resin composition means a composition containing the above-described polymer at 60% by weight or more (more preferably, 70% by weight or more), if the content is less than 60% by weight, the characteristics of the film such as thermal resistance, mechanical properties, thermal dimensional stability, etc. is damaged. A polymer other than polyester, an inorganic or organic filler, a lubricant, a colorant, etc. may be contained as long as its content is less than the remaining 40% by weight.

A biaxially oriented polyester film means a film made by melt forming the above-described resin composition into a sheet and biaxially stretching and heat treating it.

It is preferred that the refractive index of a biaxially oriented film layer of the film laminated board using the biaxially oriented polyester films according to the present invention is preferably maintained at 1.590 or more (more preferably, a range of 1.595 to 1.700) as to both axes. If the refractive index is less than 1.590, the functions ascribed to the biaxial orientation are reduced, and the property of thermal resistance in addition to the maintenance of mechanical strength and flexibility, which is the purpose of the present invention, also tends to be reduced. Where, the refractive index in the present invention is a parameter indicating an orientation degree of a biaxially oriented polyester film, and a value determined at 25° C. and 65% RH using an Abbe's refractometer. For the determination, a specimen is used, which is made by observing a sectional structure of a biaxially oriented film laminated board by an optical microscope (10 to 100 times), slicing a necessary portion mechanically or by laser, and polishing it to a thickness level capable of being measured (at a thickness of 100 μm or less).

In the biaxially oriented polyester film used in the present invention, the refractive index is defined as the degree of orientation. It is generally known that when an external force is applied to an amorphous polymer material to cause a stress inside, an anisotropy occurs optically and the refractive index along that direction changes. Namely, the refractive index is a factor closely related to the orientation of a polymer.

For example, a biaxially oriented PPS film and the orientation degree of the film will be explained. PPS in the present invention means a polymer comprising repetition units represented by the following structure (chemical formula 1) at 80 mol % or more (preferably, 85 mol % or more).

[Chemical formula 1]

In such a polymer, when the p-PPS unit is less than 80 mol % (preferably, less than 85 mol %), the crystallinity of the polymer is not enough, and the properties such as thermal resistance, thermal dimensional stability and mechanical properties, which are the characteristics of a biaxially oriented film comprising the polymer, is damaged. The polymer may contain sulfide bonds capable of being copolymerized as long as the content is less than 20 mol % of repetition units (more preferably, less than 15 mol %). Further, the copolymerization form may be either random or block. Further, a PPS resin composition means a composition containing the above-described PPS at 60% by weight or more, preferably 70% by weight % or more. If the content of PPS is less than 60% by weight, the properties of the resin composition such as crystallinity and thermal transition temperature are reduced, and the characteristics of the film composed of the composition such as thermal resistance, thermal dimensional stability and mechanical properties are damaged. Within the remaining range which is less than 40% by weight, the composition may contain an additive such as a polymer other than PPS, inorganic or organic filler, lubricant, colorant, anti-ultraviolet agent at a content not to damage the purpose of the present invention. Further, the melt viscosity of the composition is preferably in a range of 500 to 12000 poise (more preferably in a range of 700 to 10000 poise) under a condition of a temperature of 300° C. and a shear speed of 200 sec$^{-1}$, from the viewpoint of formability of the film.

The biaxially oriented PPS film is a film made by melt forming a resin composition, whose main component is the above-described polymer, into a sheet, stretching it biaxially and then heat treating it. Further, the film laminated board comprising the PPS according to the present invention may be a sheet formed by laminating two or more layers, whose contents of sulfide bonds capable of being copolymerized are different from each other, onto a biaxially oriented PPS film employed, or may be a laminate formed from biaxially oriented films which are prepared from PPS raw materials whose contents of the sulfide bonds are different from each other.

With respect to the orientation degree of the biaxially oriented film layers being laminated as a film laminated board using the PPS in the present invention, it is preferred that both of orientation degrees OF in End direction and Edge direction determined by X-ray diffraction is maintained to be 0.85 or less (more preferably, 0.80 or less), from the viewpoint of maintenance of flexibility, mechanical strength and thermal resistance. Where, the orientation degree determined in Edge direction (or in End direction) is defined, after taking an X-ray plate photograph by an incident X ray in a direction parallel to both of a film surface and the longitudinal direction (or the transverse direction) of the film, as a ratio of $I_{\phi[}30°]/I_{\phi[}0°]$ of $I_{\phi[}30°]$ to $I_{\phi[}0°]$, wherein $I_{\phi[}0°]$ is a blackening degree determined when scanning a diffraction ring from (200) plane of a PPS crystal in the radial direction on the equator line by a micro densitometer and $I_{\phi[}30°]$ is a blackening degree similarly determined by the scanning in the 30° direction. For the determination, a specimen is used, which is made by observing a sectional structure of a biaxially oriented film laminated board by an optical microscope (10 to 100 times), slicing a necessary portion mechanically or by laser, or laminating, and then polishing it to a thickness level capable of being measured.

The film laminated board according to the present invention is a board having a thickness of 0.5 mm or more which is laminated at a multi-layer condition without interposing an adhesive. To laminate without interposing an adhesive means that the board is formed basically from only biaxially oriented film layers of a resin composition according to the present invention. If a layer other than the biaxially oriented layer of the resin composition is used, the properties such as thermal resistance (long term), chemical resistance and oil resistance may be decreased, and the workability may be reduced because other resins such as the adhesive would bleed out or adhere to a mold at the time of punching or cutting. Further, in the present invention, although to laminate at a multi-layer condition means to laminate at a lamination condition of 3 layers or more, a lamination condition of 5 layers or more is preferred in order to effectively achieve providing mechanical strength and flexibility which is the purpose of the present invention. Further, the thickness of the film laminated board according to the present invention is 0.5 mm or more, and a thickness less than that cannot be applied to the electrical insulation field because such a laminated board is low in stiffness. The thickness is a value determined based on JIS C2111 (1981). Although the thickness of the film laminated board according to the present invention is not particularly limited as long as it is 0.5 mm or more, it is preferably less than 50 mm from the viewpoint of workability for lamination.

Furthermore, it is important that the minimum value of the elongation at break of the film laminated board according to the present invention is 25% or more. The elongation at break means a rate of elongation at the time of breakage determined by a tensile test based on JIS C2111 (1984), and the minimum value means a smaller rate of elongation at break determined in the longitudinal and transverse directions of the film laminated board punched into a rectangular form at a size of 500 mm×400 mm. If the value is less than 25%, the flexibility, which is the purpose of the present invention, cannot be provided, cracks are liable to occur in the board at the time of punching or cutting and the workability may decrease, and when the board is used as an electrical insulation member, it cannot be used at a position concentrated with stress, and the purpose of the present invention may not be achieved. The film laminated board according to the present invention may be formed from two or more plastic resin layers different in kind from each other unless the purpose of the present invention is not damaged.

The electrical insulation board in the present invention means a board or a product processed therefrom by molding, punching, cutting, etc., which is used for electrical insulation for power equipment and electric equipment such as a generator, a large motor, a transformer, etc. and which has a thickness of 0.5 mm or more. The electrical insulation board of the present invention may be either one manufactured by directly using a biaxially oriented film laminated board according to the present invention or one manufactured by laminating it with another electrical insulation material. In a case where another electrical insulation material is laminated and when used for a high functional insulation field requiring properties of mechanical strength, flexibility, insulation property, thermal resistance, etc. of the electrical insulation board which are the purposes of the present invention, it is preferred that the thickness of the film laminated board according to the present invention occupies 50% or more (more preferably, 60% or more) relative to the total thickness of the entire electrical insulation board. If the thickness ratio is less than 50%, the mechanical strength and flexibility, which are the purposes of the present invention, decrease, and the thermal resistance and insulation property also decrease, and therefore, miniaturization and functionalization become difficult to be achieved. Where, as the remaining base material for forming the electrical insulation board of the present invention, a pressboard comprising pulp, a board comprising a fibrous sheet, a biaxially oriented film or a board having a low thermal resistance, a resin board which is not biaxially oriented, etc. can be used. Further, as the lamination method thereof, a method for laminating it via a known adhesive can be employed. Although the total thickness of the electrical insulation board of the present invention is not particularly limited, the thickness is generally in a range of 0.5 mm to 150 mm.

Further, the machine part of the present invention means various machine parts in which the film laminated board according to the present invention is used as the base material and which are manufactured by various processings, that is, by cutting, punching, drawing, etc. As examples, a gear, a roller, a cover material used for the purpose of insulation or protection, a washer, a spacer, etc. which are used at forms of metal parts are raised. Further, members for vehicles, etc., which are made from resin instead of metal for the purpose of lightening, are also included in the present invention. For example, a bonnet, a door, a reinforcement material or a protection cover material for a floor, etc. can be exemplified. Further, it may be laminated onto another base material, and the machine part may be applied with surface printing such as painting, embossment or coloring.

Next, with respect to the method for producing the biaxially oriented film laminated board, one example thereof will be explained. First, the resin composition having a melting point of 240° C. or higher in the present invention, and the polyester (PET, PEN) films and the polyphenylene sulfide (PPS) film, will be explained raising examples.

First, the method for producing the PET film will be explained. PET can be obtained by transesterification of terephthalic acid or a derivative thereof and ethylene glycol by a known method. At that time, known reaction catalyst and anti-coloring agent can be used, as the reaction catalyst, alkali metal compound, alkali earth metal compound, zinc compound, lead compound, manganese compound, cobalt compound, aluminium compound, antimony compound, titanium compound, etc. can be exemplified, and as the anti-coloring agent, phosphorus compound, etc. can be exemplified. Desirably, in an arbitrary stage before completion of production of PET, it is preferred to add an antimony compound, germanium compound or titanium compound as the polymerization catalyst. As such a method, for example, if a germanium compound is taken as an example, a method for adding germanium compound powder as it is, a method for adding germanium compound by dissolving it in the glycol component which is a raw material of PET, as described in JP-B-54-22234, etc. can be exemplified.

The intrinsic viscosity [η] of PET is preferably controlled in a range of 0.5 to 1.2 from the viewpoint of workability of a biaxially oriented film described later. Further, in order to increase the [η], a method so-called solid phase polymerization for heating PET with an [η] of about 0.6 or less at a temperature in a range of 190° C. to a temperature lower than the melting point of the PET under a pressure-reduced condition or a condition where an inert gas such as nitrogen gas flows, can also be employed, and in this method, the intrinsic viscosity can be increased without increasing the amount of the carboxylic end groups of PET.

The PET is formed into a biaxially stretched film in order to obtain the biaxially oriented layer of the present invention. After the PET is dried as needed, it is supplied to a known melt extruder, it is extruded from a slit die as a sheet, the sheet is brought into contact with a metal drum and cooled at a temperature of the glass transition temperature of the PET (hereinafter, also referred to as "Tg" for short) to prepare a non-stretched film. The film can be stretched to a biaxially stretched film by a known method such as simultaneous biaxial stretching or sequential biaxial stretching. As the condition of this case, an arbitrary condition for the stretching temperature can be selected from a range of Tg or higher to Tg+100° C. or lower, and usually a range of 80 to 170° C. is preferable from the viewpoints of the properties of the film finally obtained and the productivity. Although the draw ratio can be selected from a range of 1.6 to 5.0 times for both of longitudinal and transverse directions, from the viewpoints of providing flexibility to the film laminated board (control of molecular orientation degree) that is the purpose of the present invention and unevenness in thickness and thermal dimensional stability of the film, the draw ratios in both of the longitudinal and transverse directions are preferably in a range of 2 to 4.5 times and the stretching ratio (the draw ratio in the longitudinal direction/the draw ratio in the transverse direction) is preferably in a range of 0.75 to 1.5. Further, the stretching speed is preferably in a range of 1000 to 200000%/min. The film is further heat treated, and the heat treatment can be performed continuously in a heat treatment chamber followed to a tenter for transverse stretching, or can also be performed by heating in another oven or by heating by heated rollers. From the viewpoint of the control of molecular orientation degree which is the purpose of the present invention, a tenter system performed by being restricted (fixed) in the longitudinal and transverse directions is most preferable. As the conditions for this heat treatment, it is preferred that the temperature is controlled in a range of 150 to 245° C. (more preferably, in a range of 170 to 235° C.), the time is controlled in a range of 1 to 120 seconds, and a relax is given under a condition of restricted shrinkage of 12% or less (preferably, 10% or less), from the viewpoint of thermal dimensional stability. Further, in order to control the molecular orientation degree of the film laminated board of the present invention within the range according to the present invention, it is preferred to control the refractive index of the above-described PET-BO in a range of 1.600 to 1.700. Although the film thickness employed in the present invention is not particularly limited, the thickness is preferably in a range of 10 to 450 μm from the viewpoint of the workability for lamination at a multi-layer condition.

Next, the method for producing the PEN film will be explained. PEN is generally produced by a known method for condensation polymerizing naphthalene-2,6-dicarboxylic acid or a derivative thereof, for example, naphthalene-2,6-dicarboxylic methyl, and ethylene glycol, under a condition of presence of a catalyst and under an appropriate reaction condition. The intrinsic viscosity corresponding to the polymerization degree of PEN is preferably 0.5 or more from the viewpoints of mechanical properties, hydrolysis resistance, thermal resistance and weather resistance. In order to increase the intrinsic viscosity, heat treatment or solid phase polymerization under a pressure reduced condition or in an atmosphere of inert gas at a temperature of the melting point or lower can also be employed.

The PEN thus obtained is formed into a biaxially stretched film in order to obtain a biaxially oriented layer. The biaxially stretched film can be made by drying the polymer, forming into a sheet at a temperature in a range of 280 to 320° C. by a melt extruder, casting the sheet at a temperature of the Tg or lower, and employing a method similar to the aforementioned method for PET-BO. As the stretching conditions of this case, the draw ratio is preferably in a range of 2 to 10 times at a temperature in a range of 120 to 170° C. in both of the longitudinal and transverse directions, and the stretching ratio (the draw ratio in the longitudinal direction/the draw ratio in the transverse direction) is preferably in a range of 0.5 to 2.0, respectively, from the viewpoints of unevenness in thickness of the film and control of molecular orientation degrees in both directions. This film is heat treated in a manner similar to that in the above-described PET-BO, and as the conditions for this heat treatment, it is preferred that the temperature is controlled in a range of 200 to 265° C. (more preferably, in a range of 220 to 260° C.), and while a relax is given under a condition of restricted shrinkage of 7% or less in the transverse direction, the time is controlled in a range of 1 to 180 seconds. In order to control the molecular orientation degree of the film laminated board of the present invention within the range according to the present invention, it is preferred to control the refractive index of the above-described biaxially oriented PEN film (hereinafter, also referred to as "PEN-BO" for short) in a range of 1.600 to 1.750. Although the thickness of the film is not particularly limited, the thickness is preferably in a range of 10 to 450 μm from the viewpoint of the workability for lamination at a multi-layer condition.

Next, the method for producing the PPS film will be explained. For PPS, a method is employed wherein alkali sulfide and p-dichloro benzene are reacted in a polar solvent under a condition of high temperature and high pressure. In particular, it is preferred that sodium sulfide and p-dichloro benzene are reacted in an amide-group high boiling-point polar solvent such as N-methyl-pyrolidone. In this case, in order to control the polymerization degree, it is particularly preferred to add a so-called polymerization assistant such as caustic alkali or carboxylic alkali metal salt and react them at a temperature in a range of 230 to 280° C. The pressure in the polymerization system and the time for polymerization are appropriately decided depending upon the kind and amount of the used assistant and the polymerization degree to be required. Moreover, it is preferred that the obtained polymer is washed by water or organic solvent which does not contain metal ion for the purpose of removing a by-product salt during the polymerization and the polymerization assistant. Then, inorganic particles, etc. are mixed to the PPS polymer thus prepared to obtain a resin composition.

Next, the PPS thus obtained is formed into a biaxially stretched film in order to obtain a biaxially oriented layer of PPS. The biaxially stretched film can be made by drying the PPS resin composition, supplying it to a melt extrusion apparatus represented by an extruder, melt extruding a sheet, casting the sheet at a temperature of the Tg or lower, and employing a method similar to the aforementioned method for PET-BO. As the stretching conditions of this case, the stretching temperature is preferably in a range of 85 to 105° C. and the draw ratio is preferably in a range of 1.3 to 4.5 times in both of longitudinal and transverse directions, and the stretching ratio (the draw ratio in the longitudinal direction/the draw ratio in the transverse direction) is preferably in a range of 0.5 to 2.0, respectively, from the viewpoints of unevenness in thickness of the film, control of molecular orientation degrees and thermal dimensional stability. The film is further heat treated, and as the conditions for the heat treatment, it is preferred that the temperature is controlled in a range of 200° C. to the melting point (more preferably, in a range of 220 to 275° C.), and while a relax is given under a condition of restricted shrinkage of 15% or less in the transverse direction, the time is controlled in a range of 1 to 120 seconds. In order to control the molecular orientation degree of the film laminated board of the present invention within the range according to the present invention, it is preferred to control the orientation degree OF of the above-described PPS-BO in a range of 0.2 to 0.75 for each of Edge direction and End direction. Although the thickness of the biaxially oriented PPS film is not particularly limited, the thickness is preferably in a range of 10 to 450 μm from the viewpoint of obtaining a good workability for lamination at a multi-layer condition.

Next, the method for producing the film laminated board according to the present invention will be explained. The lamination in the present invention, in a case where the above-described biaxially oriented layer (biaxially stretched film) is bonded, it is laminated by thermal fusion bonding without interposing an adhesive layer. In this case, it is preferred to apply a surface treatment to the surfaces of each biaxially oriented layer for the purpose of easy adhesion from the viewpoint of enhancing the force of the thermal fusion bonding between layers. As the surface treatment, corona discharge treatment (including corona discharge treatments in various gas atmospheres), a plasma treatment combining various conditions of regular pressure, low pressure, high temperature, low temperature, etc., oxidation treatment due to chemicals, ultraviolet ray or electron ray, etc. can be raised, and in order to suppress reduction of the orientation degree of the biaxially oriented layer which is the purpose of the present invention, a low-temperature plasma treatment in various gas atmospheres capable of performing thermal-fusion bonding at a relatively low temperature is particularly preferable. Where, the low-temperature plasma treatment means a treatment performed by exposing a surface of a biaxially oriented film to be thermally fused in a discharge condition initiated and maintained by applying a high voltage direct current or alternating current between electrodes, and the pressure during the treatment is not particularly limited and the treatment device and the discharge system may be appropriately selected. Although argon (Ar), helium (He), nitrogen ($N_2$), oxygen ($O_2$), air, carbon dioxide ($CO_2$), water vapour ($H_2O$), etc. are generally used for the treatment atmosphere, the atmosphere containing water vapour is particularly preferable because the treatment efficiency is good. Further, the water vapour may be diluted by another gas such as Ar, He, $N_2$, $O_2$, air or $CO_2$.

At that time, in the present invention, a good thermal fusion property can be obtained by a condition where the composition ratio (O/C) of the oxygen atoms (O) to the carbon atoms (C) on the surface to be thermally fused of the biaxially oriented layer is in a range of 2.5 to 20% and it is greater than the theoretical value. Where, the composition ratio means a ratio (O/C) of the number of oxygen atoms (O) to the number of carbon atoms (C) determined by measuring the surface of the biaxially oriented layer by XPS (X-ray spectroscopic analysis). Further, the theoretical value is a composition ratio in the resin composition forming the biaxially oriented layer, and for example, in a case of PET-BO, because it is represented as $(C_{10}O_4H_8)n$, the theoretical value of the composition ratio becomes $4/10=0.4000$. In a case of PEN-BO, it becomes 0.2857. Further, in a case where "O" is not contained, it becomes zero. Usually, because hydrocarbon group adheres to the surface of this kind of biaxially oriented layer at a very small amount, the actually determined value is to be smaller than the theoretical value. Where, if the (O/C), when the above-described theoretical value is set at 100, is greater than the theoretical value by a value in a range of 2.5 to 20%, in other words, if it is in a range of 102.5% to 120% of the theoretical value, a good thermal fusion property can be obtained.

Next, in the lamination method at a multi-layer condition due to the thermal fusion, the biaxially oriented films, which have been low-temperature plasma treated as described above, are stacked at a required thickness, and they are thermal-fusion bonded to each other by a known method such as heated plate pressing or vacuum pressing. In a case where the thickness is relatively small (1 mm or less) and the number of the stacking is small (10 layers or less), they may be laminated by heated roller pressing. As the conditions of the thermal-fusion bonding, the temperature is preferably in a range of 100° C. to (the melting point—50° C.) because reduction of the orientation degrees of the biaxially oriented layers can be suppressed and the flexibility, as the purpose of the present invention, can be easily given to the film laminated board. Further, although the pressing pressure is not particularly limited, it is generally in a range of 1 to 50 kg/cm². Further, although the pressing time changes depending upon the lamination thickness and the lamination method, it is generally in a range of 1 minute to 10 hours at the temperature at the time of the thermal fusion. After the lamination, the laminated board is taken out preferably after being gradually cooled down to a temperature of Tg of the used resin composition or lower from the viewpoint of maintenance of flatness of the film laminated board.

Next, the method for producing the electrical insulation board according to the present invention will be explained, and will be described as to a case of lamination with a different kind of base material, for example, with a pressboard.

First, an adhesive or a sticker is provided to one surface or both surfaces of the film laminated board made as described above or a pressboard. As the adhesive or the sticker, for example, urethane-group, epoxy-group, acrylic-group or silicone-group product can be used. Further, as the method for providing the adhesive or the sticker to the base material, in a case of processing using a cut plate, for example, there is a method for applying it by a brush, a glass rod, etc., and in a case of continuous processing, a known application method such as gravure roll method, reverse roll method or die coater method can be employed. Further, there is also a method for transferring an adhesive layer, which has been provided in advance onto another base material having a releasing property by the above-described method, to the film laminated board or the pressboard. Furthermore, the adhesive layer is dried at an appropriate condition, as needed.

To the surface of the adhesive layer of the film laminated board according to the present invention of the pressboard having the adhesive layer thus obtained, another pressboard or film laminated board according to the present invention is laminated by a heated plate pressing, etc. Prior to the lamination, it is controlled so that the thickness of the film laminated board according to the present invention becomes 50% or more of the total thickness of the entire electrical insulation board.

Next, the machine part according to the present invention can be formed, for example, in a shape such as a gear, a washer, a roller, etc., by processing the film laminated board according to the present invention solely by drawing, punching, cutting, etc., or in combination thereof.

EXAMPLES

Hereinafter, the present invention will be explained in more detail by showing examples. First, the methods for determining the respective properties of biaxially oriented film laminated boards obtained in the respective Examples and Comparative Examples.

<Properties and Determination Methods, Standards for Determination>

(1) Melting Point:

The sectional structure of a film laminated board was observed by an optical microscope (100 to 500 times), a structural resin composition was cut from the biaxially oriented film board, and it was heated and the melting point peak was measured at the following conditions by differential scanning calorimetry (DSC) (1st Run).

Measuring device: DSC7 produced by Perkin Elmer Corporation

Measuring condition: Temperature elevation speed 20° C./min.

Sample amount: 10 mg (2) Thickness:

Based on JIS C2111 (1984), it was determined by measuring a single film laminated board using a micrometer (measurement was carried out at ten positions, and the average value was employed).

(3) Tensile Strength at Break, Elongation at Break:

A film laminated board was punched into a rectangular form of 500 mm×400 mm, based on JIS C2111 (1984), the tensile test was carried out in each of the longitudinal and transverse directions of the film laminated board, the strength and the elongation at the time of breakage thereof were measured, and the lower value among the measured values of both directions was employed as the minimum value. Where, the number of the measurement times was set at 5 for each direction and the average values for both directions were determined, and the smallest among the average values was defined as the minimum value. The used tensile tester is as follows.

Type 5581 produced by Instron Corporation (4) Dielectric Breakdown Strength:

Based on JIS C2111 (1984), a dielectric breakdown voltage at the time of being applied with a direct current was determined. It was expressed as a dielectric breakdown strength (MV/m) converted into a dielectric breakdown voltage per a unit thickness. The following dielectric breakdown voltage measuring device was used. Where, the number of measurement times was 10, and it was represented as an average value of 8 data deleting the maximum and minimum values from the 10 data.

HAT-300-100RH0 produced by Hitachi Techno Service Corporation (5) Orientation Degree (Refractive Index) of Biaxially Oriented Polyester Resin Layer:

It was determined based on the method defined in JIS K7105, using an Abbe's refractometer applied with a measurement ray of sodium D-ray, at a condition of 25° C. and 65% RH. Methylene iodide was used as the mount solution. However, in a case of polyethylene-2,6-naphthalate film, sulfur methylene iodide was used. As to the expression of the refractive index, the longitudinal direction of the sample cut out as a rectangle was referred to as A and the direction perpendicular thereto was referred to as T, values in the two directions were taken, and the refractive index was indicated as an average value of three measurement data in each direction. The sample for the measurement was made by observing the sectional structure of the biaxially oriented film laminated board by an optical microscope (10 to 100 times), slicing a necessary portion mechanically or by laser, and polishing it down to a thickness capable of being measured (100 μm or less).

(6) Orientation Degree (OF) of Biaxially Oriented PPS Resin Layer:

The orientation direction of each sample was set in one direction and each sample was cut into a strip-like form with a thickness of 1 mm, a width of 1 mm and a length of 10 mm and/or molded (5% aluminium acetate solution of collodion was used for fixing each layer at the time of molding), and a plate photograph was taken by incidence of X-ray along the film surface of the biaxially oriented resin layer (Edge and End directions). D-3F type device produced by Rigaku Denki Corporation was used as the X-ray generation device, and Cu—K α ray passed through a Ni filter at 40 KV-20 mA was employed as the X-ray source.

The distance between the sample and the film was set at 41 mm, and using a non-screen type film produced by Kodak Corporation, a multiple exposure method (15 minutes and 30 minutes) was employed. Next, the intensity of (200) peak on the plate photograph was read as a blackening degree by scanning a densitometer in a radial direction from the center of the photograph at each position of φ=0° (a position on the equator line), 10°, 20° and 30°, and the orientation degree (OF) of each sample was defined as follows.

$$OF = I(\phi=30°)/I(\phi=0°)$$

Here, I(φ=30°) is a maximum intensity at the scanning at 30°, and I(φ=0°) is a maximum intensity at the scanning on the equator line. Where, an average value of data at φ=0° and φ=180° was used as the I(φ=0°), and an average value of data at φ=30° and φ=150° was used as the I(φ=30°). The measurement conditions of the densitometer are as follows.

As the device, a Sakura micro densitometer Model PDM-5 Type A produced by Konishiroku Photograph Industries, Inc.

was used, the density for the measurement was in a range of 0.0 to 4.0D (converted into a minimum measurement area of 4 µm$^2$), the optical magnification was set at 100 times, the slit width of 1 µm and the height of 10 µm were used, the film moving speed was 50 µm/sec. and the chart speed was 1 mm/sec. Where, the number of measurement times was 3 for each of Edge and End directions, and the average value thereof was used.

For the determination, a sample is used, which is made by observing a sectional structure of a biaxially oriented film laminated board by an optical microscope (10 to 100 times), slicing or laminating a necessary portion mechanically or by laser, or laminating, and then polishing it to a thickness level capable of being measured.

(7) Thermal Resistance:

A long-term thermal resistant temperature was decided as E-type material-10° C., considering that E type is necessary at minimum in the electric power field (120° C. as a temperature index for mechanical properties defined in the standard such as UL746B). It was determined by the following standards by measuring a maintenance rate of elongation at break of a film laminated board after aging at a temperature of 155° C. for 700 hours by calculating from Arrhenius' plots. Where, the number of measurement times was 5, and the average value thereof was used.

(i) Maintenance Rate of Elongation at Break:

(initial value of elongation at break–elongation at break after aging)/initial value of elongation at break×100(%)

In the method of the above-described item (3), the elongation at break was determined only in a direction in which the initial value of elongation at break was lower, and using an average value obtained by n=5 (measurement times), the maintenance rate of elongation at break was calculated. A specimen to be aged was sampled at a size for tensile test beforehand, and aged.

(ii) Standard for Determination:

○: The maintenance rate of elongation at break is 50% or more.

Δ: The maintenance rate of elongation at break is less than 50% and 40% or more.

X: The maintenance rate of elongation at break is less than 40%.

(8) Flexibility:

A sample board was cut out at a square of 100 mm and holes for inserting bolts were punched on the four corners. Further, one similar hole was opened also at a central portion of the sample. The respective four corners were fixed by bolts so that the sample became horizontal. The central portion was fastened and fixed by a bolt so as to be located at a position lower than the horizontal plane by 5 mm. The bolt at the central portion was gradually fastened, the state of the sample being curved was observed, and determined by the following standards. Where, the determination was carried out two times for each sample.

○: When curved, the sample is not broken and is not cracked, and there is no problem on appearance.

Δ: When the bolt at the central portion is fastened completely, the sample is slightly cracked.

X: Before or after the bolt at the central portion is fastened completely, the sample is perfectly broken or cracked.

(9) Workability:

A hole was opened on the sample board by a drill, it was cut into a circular shape with a radius of 20 mm by a small saw, and it was determined whether the workability reached successful level or not by the following standards due to observation of appearance.

○: The cutting can be easily carried out, cut powder is hard to adhere to the cut part, and the cut end surface is smooth. Further, there is no soil on the saw and the drill.

Δ: Although the cutting can be easily carried out, cut powder easily adhere or the cut end surface is slightly rough. Further, there is soil slightly on the saw and the drill.

X: The cutting is difficult. Cut powder easily adhere to the cut surface, and because the cut end surface is rough, it requires time to fix the surface. There is much substance adhered onto the saw and the drill, and a long-time processing is difficult.

(10) Ratio in Lamination Structure of Electrical Insulation Board:

The section of an electrical insulation board was observed by an optical microscope (10 to 100 times), a photograph was taken, the dimension of the sectional photograph was measured, the ratio in lamination structure (biaxially oriented film lamination thickness/total thickness×100) was determined and expressed by % (it was expressed as an average value of three data measured at different places). Where, an adhesive layer was not counted if its total thickness was 100 µm or less.

Example 1

(1) Production of Biaxially Oriented Film

Using PET as a resin composition of a biaxially oriented film, a biaxially oriented PET film was produced by the following process.

(i) Preparation of PET Polymer:

64 parts (hereinafter, "part" means "part by weight") of ethylene glycol was mixed with 100 parts of dimethyl terephthalate, further, 0.06 part of magnesium acetate and 0.03 part of antimony trioxide were added as catalysts, and the mixture was served to transesterification while being heated to 150 to 235° C. 0.02 part of trimethyl phosphate was added thereto, it was gradually elevated in temperature and reduced in pressure, and a polymerization was carried out at a temperature of 285° C. for 3 hours. The intrinsic viscosity [η] of the obtained polyethylene terephthalate (PET) was 0.64 and the melting point was 260° C. This polymer was cut into a chip-like form with a length of 4 mm. The polymer thus obtained is referred to as "PET-1".

(ii) Production of Biaxially Oriented PET Film:

Using master chips containing 10 wt. % of silica (particle diameter: 0.3 µm) in PET-1 obtained as described above, after the chips were diluted by PET-1, which did not contain the particles, so as to achieve 0.1 wt. % finally and mixed by stirring, vacuum drying was carried out at a condition of a temperature of 180° C. and a vacuum degree of 0.5 mmHg for 2 hours, the mixture was deposited into a melt extruder with a cylinder diameter of 90 mm, and therefrom, it was cast onto a cooling drum controlled at 25° C. applying an electrostatic casting. The temperature for extrusion was 270 to 290° C. The thickness of the obtained sheet was 1.4 mm. By sequential biaxial stretching, this sheet was stretched in the longitudinal direction at a temperature of 90° C. and a draw ratio of 3.3 times, subsequently it was supplied to a following tenter and stretched in the transverse direction at a temperature of 95° C. and a draw ratio of 3.3 times. After that, it was heat treated in the same tenter at a temperature of 220° C. and relaxed by 5% in the transverse direction. The thickness of the obtained biaxially oriented PET film was 125 µm, and the orientation degree in the longitudinal direction was 1.643 and that in the transverse direction was 1.635. This biaxially oriented PET film is referred to as "PET-BO-1".

(2) Production of Film Laminated Board

A low-temperature plasma treatment was applied to both surfaces of PET-BO-1 obtained as described above, by the following method and condition. Using a low-temperature plasma treatment apparatus of internal electrode system and Ar as the gas for the treatment, the pressure was set at 40 Pa, the treatment speed was set at 1 m/min., and the treatment intensity (a value calculated by an equation of applied voltage/(treatment speed×width of electrode)) was set at 500 W·min/m². The (O/C) on the low-temperature plasma treated surface was a value greater by 10% relative to the theoretical value.

51 layers of the above-described low-temperature plasma treated PET-BO-1 were stacked and laminated at a multi-layer condition by fusion bonding by using a heated plate press device at a condition of a temperature of 140° C. and a pressure of 40 kg/cm² for 0.5 hour. The area for the lamination was 0.6 m square. After the lamination, the pressure was not rapidly released, the pressure was released after the temperature of the heated plate cooled down to 30° C., and thereafter, the film laminated board was taken out. The film laminated board obtained had a thickness of 6.4 mm and had a flexibility, and the adhesion strength thereof was good. The film laminated board thus obtained is referred to as "Laminated board-1".

Example 2

PET-BO-1 was low-temperature plasma treated on both surfaces by the same method as that in Example 1, and 51 layers were stacked and laminated at a multi-layer condition by fusion bonding them by heated plate pressing similarly in Example 1. With the conditions for the heated plate pressing, the temperature was set at 200° C., the pressure was set at 40 kg/cm² and the time was set at 3 hours. The taking out of the laminated board after lamination was carried out at the same condition as that in Example 1. The film laminated board obtained had a thickness of 6.4 mm and it was slightly hazy as compared with the Laminated board-1 of Example 1, but it had flexibility and the adhesion strength thereof was good. This film laminated board is referred to as "Laminated board-2".

Example 3

PET-BO-1 was low-temperature plasma treated on both surfaces by the same method as that in Example 1, and 51 layers were stacked and laminated at a multi-layer condition by fusion bonding them by heated plate pressing similarly in Example 1. With the conditions for the heated plate pressing, the temperature was set at 220° C., the pressure was set at 40 kg/cm² and the time was set at 5 hours. The taking out of the laminated board after lamination was carried out at the same condition as that in Example 1. The film laminated board obtained had a thickness of 6.4 mm and it was further hazy as compared with the Laminated board-2 of Example 2, but it still had flexibility. This film laminated board is referred to as "Laminated board-3".

Comparative Example 1

Silica (particle diameter: 0.3 μm) was added to PET-1 of Example 1 by the method of Example 1, and a non-stretched and non-oriented sheet was melt extruded and formed. At that time, the sheet thickness was adjusted at 125 μm (referred to as "PET-NO-1"). PET-NO-1 was low-temperature plasma treated on both surfaces by the same method as that in Example 1, and 51 layers were stacked and laminated at a multi-layer condition by thermal fusion bonding. With the conditions for the lamination by the thermal fusion bonding, a heated plate press method was employed, the temperature was set at 130° C., the pressure was set at 5 kg/cm² and the time was set at 0.5 hour. The temperature for taking out the laminated board was room temperature. The film laminated board obtained had a thickness of 6.4 mm. The film laminated board thus obtained is referred to as "Laminated board-4".

Comparative Example 2

(1) Production of Biaxially Oriented Film

Using copolymerized PET as a resin composition of a biaxially oriented film, a biaxially oriented copolymerized PET film was produced by the following process.

(i) Preparation of Copolymerized PET:

In polymerization of copolymerized PET, 0.08 part by weight of magnesium acetate and 0.022 part by weight of antimony trioxide were added to a mixture of 83 parts by weight of dimethyl terephthalate, 17 parts by weight of isophthalic acid and 67 parts by weight of ethylene glycol, and the mixture was served to transesterification while being heated so that methanol was extracted therefrom at 220° C. Then, 0.019 part by weight of 85% phosphoric acid aqueous solution and an ethylene glycol slurry of agglomerated silica particles with a mean particle diameter of 0.8 μm were added so that the particle concentration in the resin became 0.06% by weight, it was gradually elevated in temperature and reduced in pressure, finally up to 280° C. and down to 1 hPa, and a condensation polymerization was carried out until the intrinsic viscosity [α] became 0.62, to obtain a copolymerized PET. This polymer was cut into a chip-like form with a length of 4 mm. The melting point of the obtained polymer was 220° C.

(ii) Production of Biaxially Oriented Copolymerized PET Film:

By the method of Example 1, the above-described copolymerized PET was dried at a temperature of 150° C. and a vacuum degree of 0.5 mmHg for 3 hours, and it was melt extruded at 260 to 270° C. and cast. Further, the obtained non-stretched sheet was stretched in the longitudinal direction at a temperature of 110° C. and a draw ratio of 3.2 times and in the transverse direction at a temperature of 120° C. and a draw ratio of 3.5 times. Further, it was heat treated at a temperature of 170° C. and relaxed by 5% in the transverse direction. The thickness of the obtained biaxially oriented film was 100 μm, and the orientation degree in the longitudinal direction was 1.643 and that in the transverse direction was 1.631. This film is referred to as "PET-BO-2".

(2) Production of Film Laminated Board

Low-temperature plasma treatment was applied by the same method and conditions as those in Example 1, and 64 layers were stacked and laminated at a multi-layer condition by thermal fusion bonding by the same method as that of Example 1. The (O/C) on the low-temperature plasma treated surface was a value greater by 10% relative to the theoretical value. At that time, the temperature for the lamination was set at 130° C., and the pressure and the time for the thermal fusion bonding were set at the same conditions as those of Example 1. The thickness of the laminated board thus obtained was 6.4 mm. This board is referred to as "Laminated board-5".

Example 4

(1) Production of Biaxially Oriented Film

Using PPS as a resin composition of a biaxially oriented film, a biaxially oriented PPS film was produced by the following process.

(i) Preparation of PPS Resin Composition:

32.6 kg of sodium sulfide (250 mol, containing 40 wt. % of crystal water), 100 g of sodium hydride, 36.1 kg of sodium benzoate (250 mol) and 79.2 kg of N-methyl-2-pyrolidone (hereinafter, also referred to as "NMP" for short) were charged into an autoclave, they were gradually heated up to 205° C. while being stirred, and 7.0 liters of distillate containing 6.9 kg of water was removed. 37.5 kg of 1,4-dichlorobenzene (255 mol) and 20.0 kg of NMP were added to the residual mixture, and it was heated at 265° C. for 4 hours. The reaction product was washed 8 times by hot water to obtain a highly polymerized PPS having a melt viscosity of 3100 poise, a glass transition temperature of 91° C. and a melting point of 285° C. Calcium carbonate particles having a particle diameter of 1 μm were blended to the PPS polymer thus obtained by 0.2 wt. % by a mixer, the mixture was charged into a small-sized twin-screw extruder with a cylinder diameter of 30 mm and melt kneaded therein at a temperature of 310° C. to obtain a gut-like PPS resin composition. Further, the gut was cut at a length of 5 mm to make pellets. The PPS resin composition thus obtained is referred to as "PPS-1".

(ii) Production of Biaxially Oriented PPS Film:

After PPS-1 obtained as described above was vacuum dried (vacuum degree: 8 mmHg) at a temperature of 180° C. for 3 hours, it was deposited into a hopper of an extruder with a cylinder diameter of 40 mm. It was melt extruded at a temperature of 310° C., extruded from a T-die having a linear lip (width: 300 mm, gap: 2 mm) in a form of a sheet, and the sheet was cast onto a metal drum, whose surface temperature was controlled at 30° C., and cooled and solidified. The thickness of the non-stretched non-oriented sheet obtained was 1400 μm (referred to as "PPS-NO-1"). By sequential biaxial stretching, PPS-NO-1 was stretched in the longitudinal direction at a stretching temperature of 98° C. and a draw ratio of 3.9 times and in the transverse direction at a stretching temperature of 98° C. and a draw ratio of 3.5 times. Further, heat treatment was carried out at a temperature of 270° C. for 1 minute, and relax was carried out under a condition of 7% restricted shrinkage. The thickness of the obtained biaxially oriented PPS film was 100 μm, and the orientation degree OF was 0.32 in Edge direction and 0.30 in End direction. This film is referred to as "PPS-BO-1".

(2) Production of Film Laminated Board

A low-temperature plasma treatment was applied to both surfaces of PPS-BO-1 by the method and conditions of Example 1. The (O/C) on the low-temperature plasma treated surface was a value greater by 7% relative to the theoretical value. After that, 64 layers of this film were stacked and they were laminated by thermal fusion bonding by the heated plate pressing employed in Example 1. With the conditions for the heated plate pressing, the temperature was set at 180° C., the pressure was set at 40 kg/cm$^2$ and the time was set at 1 hour. The laminated board was taken out after being cooled down to a temperature of 30° C. while being maintained at the pressurized condition. The biaxially oriented film laminated board thus obtained had a thickness of 6.4 mm, and the flexibility and the adhesion strength thereof were good. This board is referred to as "Laminated board-6".

Example 5

64 layers of films of PPS-BO-1 treated low-temperature plasma on both surfaces by the same method and conditions as those in Example 4 were stacked and laminated by the method of thermal fusion bonding of Example 4. As the conditions employed for the heated plate pressing, the temperature was set at 250° C., the pressure was set at 40 kg/cm$^2$ and the time was set at 1 hour. The film laminated board obtained had a thickness of 6.4 mm and it had a slightly blackish color tone. This board is referred to as "Laminated board-7".

Example 6

(1) Production of Biaxially Oriented Film

Using copolymerized PPS as a resin composition of a biaxially oriented film, a biaxially oriented copolymerized PPS film was produced by the following process.

(i) Preparation of Copolymerized PPS Resin Composition:

100 mol of sodium sulfide 9 hydrate, 45 mol of sodium acetate and 25 liters of NMP were charged into an autoclave, they were gradually heated up to 220° C. while being stirred, thereby removing contained water component by distillation. 80 mol of p-dichlorobenzene as a main-component monomer, 19.8 mol of m-dichlorobenzene as a sub-component monomer and 0.2 mol of 1,2,4-trichlorobenzene were added into the dehydrated system together with 5 liters of NMP, and after nitrogen was enclosed at a pressurizing condition of 3 kg/cm$^2$ at 170° C. thereinto, it was elevated in temperature and polymerized at 260° C. for 4 hours. After the polymerization was finished, it was cooled, the polymer was precipitated in distilled water, and small blocks of the polymer were taken by a metal mesh having a size of 150 mesh.

After this polymer was washed 5 times by distilled water having a temperature of 90° C., it was dried at 120° C. under a pressure-reduced condition to obtain white-particle like copolymerized PPS having a melt viscosity of 1000 poise and a melting point of 245° C. Further, spherical silica particles with a mean particle diameter of 0.5 μm were compounded to this polymer at a content of 0.5 wt. % and they were uniformly mixed by a blender, and thereafter, the mixture was extruded by a twin-screw extruder having a cylinder diameter of 30 mm at 300° C. in a gut-like form, and it was cut at a length of about 5 mm to make pellets.

(ii) Production of Biaxially Oriented PPS Film:

A biaxially stretched film was prepared by the same method as that of Example 4 other than a condition where the temperature for heat treatment was changed to 220° C. The thickness of the obtained film was 100 μm, and the orientation degree OF was 0.37 in Edge direction and 0.35 in End direction. This biaxially oriented film is referred to as "PPS-BO-2".

(2) Production of Film Laminated Board

Fusion lamination of 64 layers was carried out by the same method as that of Example 4 other than a condition where the temperature for the heated plate pressing was changed to 150° C. Where, the (O/C) on the low-temperature plasma treated surface was a value greater by 7% relative to the theoretical value. The obtained laminated board had a flexibility and was good in adhesion strength, and its thickness was 6.4 mm. This board is referred to as "Laminated board-8".

Comparative Example 3

A low-temperature plasma treatment was applied to both surfaces of PET-BO-1 obtained in Example 1 at conditions similar to those of Example 1, and 47 layers of the PET-BO-1 were laminated via the following adhesive.

Used adhesive: Epoxy group adhesive. The compounding is as follows.

A mixture of 60 wt. % of polyamide resin ("Versalon" produced by Henkel Corporation), 30 wt. % of bisphenol A group epoxy resin ("Epikote" 834 produced by Shell Corporation), 8 wt. % of dimer acid group modified glycidyl ester ("Epikote" 872 produced by Shell Corporation) and 2 wt. % of imidazole was mixed with and dissolved in dimethyl formaldehyde to prepare an adhesive solution of 40 wt. % and 2 poise.

The above-described adhesive was applied onto one surface of PET-BO-1 using a reverse roll coater so that the controlled thickness of the adhesive became 10 μm (Dry). With lamination conditions, heated plate pressing method was carried out at a temperature of 100° C. and a pressure of 3 kg/cm², and thereafter, at the pressurized condition, the adhesive was cured at 100° C. for 5 hours. The thickness of the obtained laminated board was 6.4 mm. This board is referred to as "Laminated board-9".

Comparative Example 4

For comparison, "Nomex" H board (produced by Du Pont-Teijin Advanced Paper Corporation) was prepared as a board with a thickness of 6.4 mm composed of aromatic polyamide fibers. This board is referred to as "Aramide board-1".

Example 7

The number of lamination layers of a biaxially oriented PET film in the method of Example 1 was changed, and a laminated board having 32 layers of biaxially oriented PET films was manufactured. On the other hand, an aramide board with a thickness of 0.8 mm used in Comparative Example 4 was prepared. Where, the laminated board with 32 layers was set to be a core layer, on one surface two layers of the above-described aramide boards were laminated, and on the other surface a single layer of the aramide board was laminated. As to the lamination method, the adhesive used in Comparative Example 3 was applied onto one surface of a PET film (thickness: 25 μm), processed for giving a releasing property, by the method and conditions of Comparative Example 3, after being dried, the adhesive was transferred to the aramide board side, the aramide board was laminated via the transferred adhesive layer to make an electrical insulation board. As the curing condition of the adhesive, the condition of Comparative Example 3 was employed. The thickness was controlled to become 6.4 mm. The electrical insulation board obtained is referred to as "Insulation board-1".

Example 8

A laminated board laminating 27 layers of PET-BO-1 was made by the method of Example 7, on each of both surfaces thereof, two layers of aramide boards each having a thickness of 0.8 mm were laminated to obtain an electrical insulation board having a thickness of 6.6 mm. This board is referred to as "Insulation board-2".

Comparative Example 5

A laminated board laminating 20 layers of PET-BO-1 was made by the method of Example 7, three layers of aramide boards each having a thickness of 0.8 mm were laminated on one surface of the laminated board and two layers of the aramide boards were laminated on the other surface thereof to obtain an electrical insulation board having a thickness of 6.5 mm. This board is referred to as "Insulation board-3".

Example 9

28 layers of plasma treated products of PET-BO obtained by the method of Example 1 were laminated, and on each surface thereof, 29 layers of PET-BO-2 made by plasma treating the biaxially oriented copolymerized PET film were laminated, the heated plate pressing was carried out at a condition of a temperature of 130° C., a pressure of 40 kg/cm² and a time of 0.5 hour, and thus, a composite electrical insulation board of the biaxially oriented layers of homo PET and the biaxially oriented layers of copolymerized PET was made (thickness: 6.4 mm). This board is referred to as "Insulation board-4".

Comparative Example 6

21 layers of PET-BO-1 were laminated and thereon 38 layers of PET-BO-2 were laminated by the method of Example 9 to make an electrical insulation board with a thickness of 6.43 mm having the same lamination structure as that of Example 1 and different in lamination ratio (referred to as "Insulation board-5".

Example 10

Using the laminated board with a thickness of 6.4 mm which was made in Example 1, a gear having a diameter of 30 mm and a width of 6.4 mm was made by cutting and polishing.

The results of determination of respective Examples and Comparative Examples are shown in Tables 1 and 2.

TABLE 1

| | Resin composition | Thickness (mm) | Refractive index Orientation degree OF | | | | Melting point (° C.) | Tensile properties | | Dielectric breakdown strength (MV/m) | Thermal resistance | Flexibility | Workability | Laminated board No. |
| | | | A | T | Edge | End | | Strength (Mpa) | Elongation (%) | | | | | |
| --- | --- | --- | --- | --- | --- | --- | --- | --- | --- | --- | --- | --- | --- | --- |
| Example 1 | PET | 6.4 | 1.641 | 1.622 | — | — | 260 | 165 (longitudinal direction) | 95 (transverse direction) | 46.6 | ◯ | ◯ | ◯ | Laminated board-1 |

TABLE 1-continued

| | Resin composition | Thickness (mm) | Refractive index Orientation degree OF | | | | Melting point (°C.) | Tensile properties | | Dielectric breakdown strength (MV/m) | Thermal resistance | Flexibility | Workability | Laminated board No. |
| | | | A | T | Edge | End | | Strength (Mpa) | Elongation (%) | | | | | |
|---|---|---|---|---|---|---|---|---|---|---|---|---|---|---|
| Example 2 | PET | 6.4 | 1.623 | 1.614 | — | — | 260 | 155 (longitudinal direction) | 65 (transverse direction) | 45.7 | ○ | ○ | ○ | Laminated board-2 |
| Example 3 | PET | 6.4 | 1.601 | 1.594 | — | — | 260 | 130 (longitudinal direction) | 33 (transverse direction) | 46.3 | Δ | Δ | ○ | Laminated board-3 |
| Comparative Example 1 | PET | 6.4 | 1.579 | 1.580 | — | — | 260 | 61 (longitudinal direction) | 12 (transverse direction) | 46.0 | X | X | X | Laminated board-4 |
| Comparative Example 2 | PET | 6.4 | 1.621 | 1.636 | — | — | 220 | 133 (transverse direction) | 76 (longitudinal direction) | 43.1 | X | ○ | ○ | Laminated board-5 |
| Example 4 | PPS | 6.4 | — | — | 0.35 | 0.36 | 285 | 177 (transverse direction) | 50 (longitudinal direction) | 40.6 | ○ | ○ | ○ | Laminated board-6 |
| Example 5 | PPS | 6.4 | — | — | 0.71 | 0.78 | 285 | 142 (transverse direction) | 29 (longitudinal direction) | 39.8 | ○ | Δ | Δ | Laminated board-7 |
| Example 6 | PPS | 6.4 | — | — | 0.39 | 0.40 | 245 | 165 (transverse direction) | 52 (longitudinal direction) | 41.2 | Δ | ○ | ○ | Laminated board-8 |
| Comparative Example 3 | PET (adhesive) | 6.4 | — | — | — | — | 260 | 134 (longitudinal direction) | 104 (transverse direction) | 45.0 | X | ○ | X | Laminated board-9 |
| Comparative Example 4 | Aramide paper | 6.4 | — | — | — | — | None | 32 (transverse direction) | 8.6 (transverse direction) | 23.0 | ○ | X | X | Aramide board-1 |

1. A of refractive index indicates a value in the longitudinal direction of a rectangular sample cut out, and T indicates a value in a direction perpendicular thereto.
2. Each direction indicated under measured value of tensile property represents a direction of minimum measured value.

TABLE 2

| | Thickness of laminated board layer(mm) | Thickness of other material layer(mm) | Rate in lamination structure (%) | Elongation at break (%) | Thermal resistance | Flexibility | Workability | Dielectric breakdown strength (MV/m) | Insulation board No. |
|---|---|---|---|---|---|---|---|---|---|
| Example 7 | 4.0 | 2.4 | 62.5 | 34 | ○ | ○ | ○ | 35.2 | Insulation board-1 |
| Example 8 | 3.4 | 3.2 | 51.5 | 27 | ○ | Δ | Δ | 30.5 | Insulation board-2 |
| Comparative Example 5 | 2.5 | 4.0 | 38.5 | 12 | ○ | X | X | 26.0 | Insulation board-3 |
| Example 9 | 3.5 | 2.9 | 55.0 | 85 | Δ | ○ | ○ | 46.2 | Insulation board-4 |
| Comparative Example 6 | 2.6 | 3.8 | 40.8 | 77 | X | ○ | ○ | 46.4 | Insulation board-5 |

SUMMARY

The biaxially oriented film laminated board according to the present invention is high in mechanical strength, excellent in electrical insulation property and thermal resistance, and is a board maintaining a flexibility and having properties of a biaxially oriented film, and further, has an excellent workability. Because the board is high in strength and excellent in flexibility and electrical insulation property, the thickness of the electrical insulation layer can be made small, and the characteristics for lightening, thinning and downsizing and design freedom can be improved. This is well understood by comparing the film laminated board according to the present invention (Examples 1 to 6) with the Aramide board-1 of Comparative Example 4 which is a conventional insulation board.

Examples 1 to 3 and Comparative Example 1 relate to film laminated board each made by laminating PET-BO at a multilayer condition, these examples indicate a tendency that the properties of mechanical properties, flexibility and thermal resistance decrease as the orientation degree (refractive index) of the biaxially oriented film layer forming the board decreases and approaches a non-oriented condition, and it is understood that, in the Laminated board-4 of Comparative Example 1 which became a non-oriented condition, the mechanical properties including thermal resistance and flexibility cannot achieve the purpose of the present invention. Further, Examples 4 and 5 indicate the relationship between the orientation degree and the mechanical properties of the film laminated board using PPS-BO, and similarly to in the above-described case of PET-BO, there is a tendency that the mechanical properties and the flexibility decrease as the orientation degree OF increases (reduction of orientation degree).

Further, from the results of Laminated board-1 of Example 1, Laminated board-5 of Comparative Example 2 using copolymerized PET-BO, Laminated board-6 of Example 4 using PPS-BO and Laminated board-8 of Example 6 using copolymerized PPS-BO, it is understood that there is a tendency that the thermal resistance decreases as the melting point is lowered, and for the insulation field requiring a long-term thermal resistance which is the purpose of the present invention, it is necessary to use a biaxially oriented layer comprising a plastic resin which has a melting point of 240° C. or higher.

Further, as understood from the result of Laminated board-9 of Comparative Example 3, if an adhesive is used for lamination of respective layers, the amount of the adhesive is great, and deterioration in thermal resistance of the adhesive layer influences the entire of the laminated board, and therefore, the purpose of the present invention cannot be achieved. Moreover, the adhesive may come out at the time of processing or may adhere to a mold, a drill, a cutter, etc. for punching, etc., and the workability may be remarkably reduced.

In the lamination according to the present invention, because thermal fusion bonding is employed, problems as described above do not occur. Further, in order to prevent reduction of the orientation degree of biaxially oriented film layer as much as possible, it is necessary to apply a plasma treatment (preferably, a low-temperature plasma treatment) and carry out the thermal fusion bonding at a temperature as low as possible. The low-temperature thermal fusion bonding due to the plasma treatment in the present invention could achieve a high adhesion strength, and could bear enough against various processings such as punching, drawing, cutting, etc.

Next, as to the electrical insulation board according to the present invention, although it can be applied to various fields by laminating another electrical insulation material layer onto the biaxially oriented film laminated board according to the present invention, for a field requiring a high-function electrical insulation material which has excellent mechanical strength, flexibility, thermal resistance and insulation property together, unless 50% or more in thickness relative to the thickness of the entire electrical insulation board comprises the biaxially oriented film laminated board according to the present invention, the required mechanical properties (flexibility), thermal resistance, etc. cannot be achieved. As shown in Table 2, Insulation boards-1 to -3 of Examples 7 and 8 and Comparative Example 5 are composites of an aramide board and the laminated board of PET-BO according to the present invention, and when used as an electrical insulation board by lamination with a raw material such as aramide which has a thermal resistance but which is poor in mechanical properties (flexibility) and insulation property, if the biaxially oriented film laminated board is not contained at a content of 50% or more relative to the total thickness of the board, the flexibility cannot be maintained as well as the dielectric breakdown strength decreases. Further, in the determination results of Insulation boards-4 and -5 of Example 9 and Comparative Example 6, they are examination examples being combined with a low-thermal resistance material, and it is also understood that, unless the thickness of the biaxially oriented film laminated board according to the present invention is 50% or more relative to the total thickness, the thermal resistance cannot be maintained.

Example 10 shows an example of a machine part (gear) manufactured by cutting the biaxially oriented film laminated board according to the present invention. Although the gear was attached to a shaft set in a rotational equipment and it was operated for a long time, there were no problems such as abrasion at all. Further, as compared with a case using a metal gear, the rotational equipment could be lightened, the load applied to the shaft was decreased, and design freedom was increased.

INDUSTRIAL APPLICATIONS OF THE INVENTION

The biaxially oriented film laminated board according to the present invention is suitable to be used for various electrical insulation boards and various machine parts.

The invention claimed is:

1. A biaxially oriented film laminated board having a thickness of 0.5 mm or more and formed by laminating multiple layers of biaxially oriented films composed of a resin composition having a melting point of 240° C. or higher without interposing an adhesive therebetween,
wherein the minimum value of elongation at break in the longitudinal direction and in the transverse direction measured after punching said board into a rectangular shape is 25% or more, said biaxially oriented films are biaxially oriented polyphenylene sulfide films, and both orientation degrees OF in End direction and Edge direction of the biaxially oriented film layers after lamination, which are determined by X-ray diffraction, are 0.85 or less.

2. The biaxially oriented film laminated board according to claim 1, wherein said biaxially oriented films are biaxially oriented polyester films, and a refractive index of the biaxially oriented film layers after lamination is 1.590 or more.

3. An electrical insulation board, wherein 50% or more of said electrical insulation board relative to the total thickness of said electrical insulation board is formed by the biaxially oriented film laminated board according to claim 1.

4. A machine part, wherein said machine part is manufactured by using the biaxially oriented film laminated board according to claim 1 as its substrate and processing said substrate.

5. An electrical insulation board, wherein 50% or more of said electrical insulation board relative to the total thickness of said electrical insulation board is formed by the biaxially oriented film laminated board according to claim 2.

6. A machine part, wherein said machine part is manufactured by using the biaxially oriented film laminated board according to claim 2 as its substrate and processing said substrate.

* * * * *